(12) United States Patent
Semba et al.

(10) Patent No.: US 7,352,851 B1
(45) Date of Patent: Apr. 1, 2008

(54) EXCHANGE AND COMPUTER READABLE MEDIUM STORING EXCHANGE CONTROL PROGRAM

(75) Inventors: Fumiko Semba, Tokyo (JP); Takeshi Uehara, Tokyo (JP); Yoshinori Yamaki, Sendai (JP); Yoshinori Takahashi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/465,708

(22) Filed: Dec. 17, 1999

(30) Foreign Application Priority Data

Dec. 18, 1998 (JP) .................................. 10-361597

(51) Int. Cl.
*H04M 15/00* (2006.01)
*H04M 7/00* (2006.01)

(52) U.S. Cl. .............................. 379/114.02; 379/219
(58) Field of Classification Search ........... 379/114.02, 379/219, 221.01
See application file for complete search history.

(56) References Cited

U.S. PATENT DOCUMENTS

| | | | |
|---|---|---|---|
| 4,791,665 A * | 12/1988 | Bogart et al. ................ 379/207 |
| 5,550,915 A * | 8/1996 | Partridge, III ......... 379/114.01 |
| 5,862,203 A * | 1/1999 | Wulkan et al. ......... 379/114.02 |
| 5,995,602 A * | 11/1999 | Johnson et al. ......... 379/114.02 |
| 6,064,653 A * | 5/2000 | Farris .......................... 370/237 |
| 6,078,652 A * | 6/2000 | Barak ...................... 379/114.02 |
| 6,091,808 A * | 7/2000 | Wood et al. ............ 379/201.04 |
| 6,148,067 A * | 11/2000 | Leipow ....................... 370/259 |
| 6,169,791 B1 * | 1/2001 | Pokress ................. 379/114.02 |
| 6,330,311 B1 * | 12/2001 | Mijares et al. ......... 379/112.01 |
| 6,381,315 B1 * | 4/2002 | Nhaissi ....................... 379/111 |
| 6,574,216 B1 * | 6/2003 | Farris et al. ................ 370/352 |

FOREIGN PATENT DOCUMENTS

JP 10-155034 6/1998
JP 11-284728 10/1999

OTHER PUBLICATIONS

Japanese Office Action mailed May 8, 2007, with partial translation, from the corresponding Japanese Application.

* cited by examiner

*Primary Examiner*—Rasha S. Al-Aubaidi
(74) *Attorney, Agent, or Firm*—Katten Muchin Rosenman LLP

(57) ABSTRACT

An exchange is provided, the exchange receiving a number of a telephone terminal of a called party, selecting a network from a plurality of connectable networks including the Internet with the number and connecting to the network. In addition, the exchange calls the telephone terminal via a network other than the Internet and connects to the telephone terminal in response to a predetermined operation by a caller during a call via the Internet.

3 Claims, 13 Drawing Sheets

FIG. 12

|   | RECEIVED NUMBER | |
|---|---|---|
| ① | 7721 | 2001 |
| ② | 7722 | 2002 |
| ③ | 044 777 1212 | |

⇒

|   | CONVERTED DESTINATION NUMBER | | |
|---|---|---|---|
| ① | 7721 | IP ADDRESS 1 | 2001 |
| ② | 7722 | IP ADDRESS 1 | 2002 |
| ③ | IP ADDRESS 2 | | |

EXCHANGE AND COMPUTER READABLE MEDIUM STORING EXCHANGE CONTROL PROGRAM

BACKGROUND OF THE INVENTION

1. Field of the Invention

The present invention generally relates to an exchange, and more particularly to an exchange which is applicable to a call via the Internet and which has a function for switching from a call via the Internet to a call via another network.

2. Description of the Related Art

When making a call via the Internet, the charge for a call is the sum of a telephone charge to an Internet provider and a charge for the Internet provider to connect to the Internet. Therefore, communications costs can be reduced substantially. Thus, it is strongly needed to use an Internet telephone system for a long-distance call and the like.

FIG. 1 is a diagram showing an example of a conventional internet telephone system. In FIG. 1, when a personal computer of a user A originates a call to a personal computer of a user B, the personal computer of the user A designates an IP address of the personal computer of the user B, connects to the personal computer of the user B and starts a call.

As mentioned above, according to the conventional system, it is necessary to input an IP address of a called party in order to make a call via the Internet. In addition, there may be cases where speech quality is degraded according to conditions of the Internet. In such a case, conventionally, a connection via the Internet needs to be disconnected and the connection is switched to a connection via a telephone network or the like by redialing manually. In addition, a caller needs to know a plurality of numbers such as an IP address, a telephone number of a called party and the like.

SUMMARY OF THE INVENTION

It is an object of the present invention to provide an exchange which can select a network from a plurality of networks with only a number of a telephone terminal of a called party.

The above object of the present invention is achieved by an exchange comprising:

a part which receives a number of a telephone terminal of a called party; and a part which selects a network from a plurality of connectable networks including the Internet with the number and connects to the network.

According to the above-mentioned invention, it becomes easy to connect to the called party via the Internet or, for example, via a public telephone network by receiving a number of a telephone terminal. Therefore, a caller does not need to know each destination number for each network. Instead, the caller needs to know only one number.

BRIEF DESCRIPTION OF THE DRAWINGS

Other objects, features and advantages of the present invention will become more apparent from the following detailed description when read in conjunction with the accompanying drawings, in which:

FIG. 12 is tables showing an example of address conversion in an address conversion process in step 51 shown in FIG. 11;

DETAILED DESCRIPTION OF THE PREFERRED EMBODIMENTS

Figure 1:
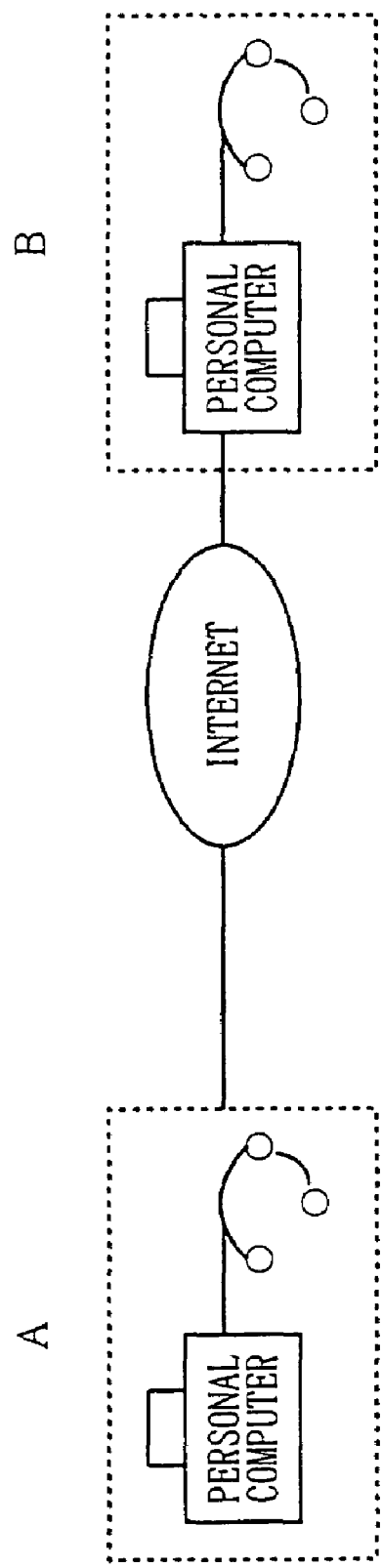
FIG. 1 is a diagram showing an example of a conventional internet telephone system.
Figure 2:
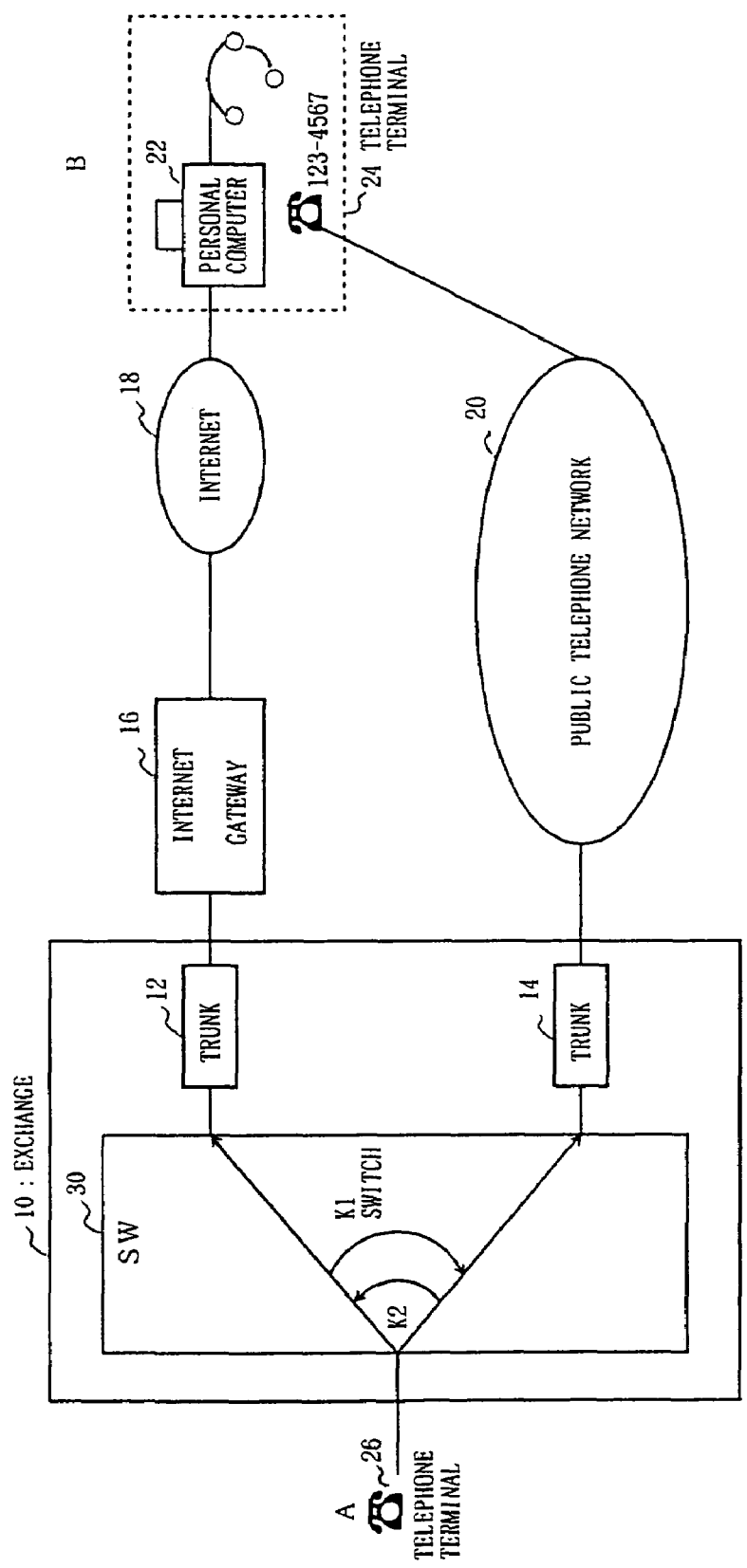
FIG. 2 is a block diagram of a communication system according to a first embodiment of the present invention.

FIG. 2 is a block diagram of a communication system according to a first embodiment of the present invention. As shown in FIG. 2, a telephone terminal 26 of a user A is connected to an exchange 10. The exchange 10 is connectable to a personal computer 22 of a user B via an Internet gateway 16 and the Internet 18. And also, the exchange 10 is connectable to a telephone terminal 24 of the user B via a public telephone network 20. The exchange 10 includes a trunk 12 which is connected to the Internet gateway 16 and a trunk 14 which is connected to the public telephone network 20. In addition, the exchange 10 includes an LCR control function and a switch part 30 (SW). The LCR control function selects the least expensive route.

When the telephone terminal 26 of the user A dials a telephone number (123-4567) of the user B and the exchange 10 selects a route via the Internet 18 by the LCR control function, the telephone number of the user B (123-4567) is converted to an IP address of the user B at the Internet gateway 16. As a result, the telephone terminal 26 of the user A starts a call with the personal computer 22 of the user B. When a good speech quality is not obtained according to conditions of the Internet 18, the connection route is switched to a route via the public telephone network 20 (k1) by a simple operation (which will be described later) at the telephone terminal 26 of the user A, and a call is originated. Additionally, when the same operation is performed during a call via the public telephone network 20, the connection is switched to the route via the Internet 18 (k2) and a call is originated.

Figure 3:
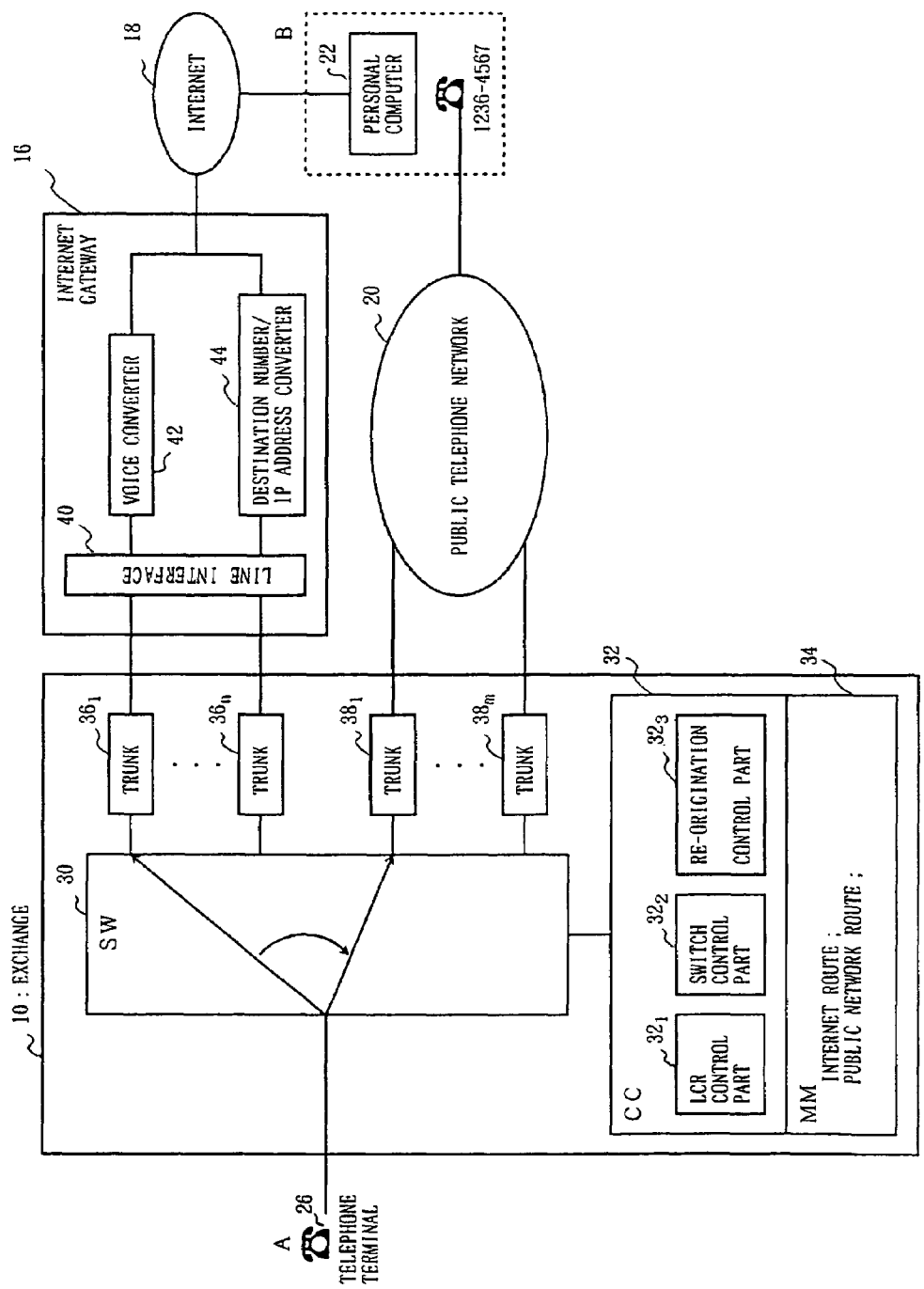
FIG. 3 is a block diagram of an exchange 10 and an Internet gateway 16 shown in FIG. 2.

FIG. 3 is a block diagram of the exchange 10 and the Internet gateway 16 shown in FIG. 2. The exchange 10 includes trunks $36_1$-$36_n$ which are connected to the Internet gateway 16 and trunks $38_1$-$38_m$ which are connected to the public telephone network 20. In addition, the exchange 10 includes the switch part (SW) 30, a control part (CC) 32 and a memory (MM) 34. The control part 32 includes an LCR control part $32_1$, a switch control part $32_2$, and a re-origination control part $32_3$. The LCR control part $32_1$ selects the least expensive network. The switch control part $32_2$ controls switching from a network to another network. The re-origination control part $32_3$ controls an operation for re-origination. The memory 34 stores information of routes of the Internet and the public telephone network. The Internet gateway 16 includes a line interface 40, a voice converter 42 and a destination number/IP address converter 44. The line interface 40 is connected to the trunks $36_1$-$36_n$. The voice converter 42 is connected to the line interface 40 and the destination number/IP address converter 44 is connected to the Internet 18.

Figure 4:
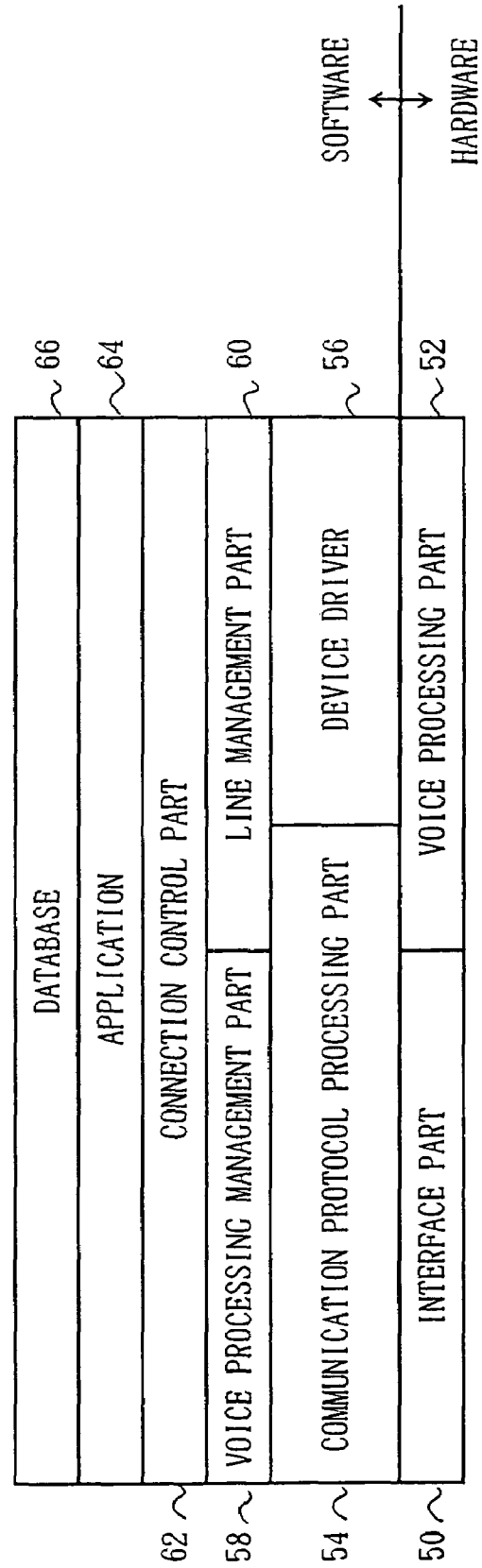
FIG. 4 is a diagram of a software configuration of the Internet gateway 16.

FIG. 4 is a diagram of a software configuration in the Internet gateway 16. The software of the Internet gateway 16 performs processes necessary for a voice call via the Internet. As shown in FIG. 4, the software of the Internet gateway 16 includes an interface part 50 which connects to the Internet and the like, a voice processing part 52 which converts voice data to packets, a communication protocol processing part 54, a device driver 56, a voice processing management part 58 which manages voice processing, a line management part 60 which manages a line, a connection control part 62, an application part 64 and a database part 66 which stores and manages call information. The communication protocol processing part 54 processes communication protocols such as TCP/IP, H.323 and the like. The interface part 50 and the voice processing part 52 are realized by hardware. Other parts are realized by software.

The operation of the configuration shown in FIG. 3 is as follows. When the exchange 10 receives dial information (123-4567) of the user B from the telephone terminal 26 of the user A, the LCR control part $32_1$ selects a route of the lowest charge with reference to data in the memory 34. As a result, if the route via the Internet 18 is selected, the exchange 10 selects a trunk among the trunks $36_1$-$36_n$ which are connected to the Internet gateway 16. When the Internet gateway 16 receives the dial information (123-4567) from the exchange 10, the Internet gateway 16 converts the dial information into an IP address of the personal computer 22 with the destination number/IP address converter 44, and sends the IP address to the Internet 18. Thereby, the Internet gateway 16 is connected to the personal computer 22. In addition, the voice converter 42 converts voice data into IP packets such that the telephone terminal 26 can communicate with the personal computer 22.

When the exchange 10 receives, from the telephone terminal 26, a request for switching to the route via the public telephone network 20, the exchange 10 disconnects the connection to the Internet gateway 16 by using the switch control part $32_2$ of the control part 32, releases the trunk, and selects a trunk among the trunks $38_1$-$38_m$ after selecting a route via the public telephone network 20 with reference to the memory 34. Moreover, the exchange 10 originates a call, by using the re-origination control part $32_3$, with the dial information (123-4567) of the user B which is stored in the memory 34.

Next, the configuration shown in FIG. 3 will be described in detail with reference to sequence charts shown in FIGS. 5-9.

Figure 5:
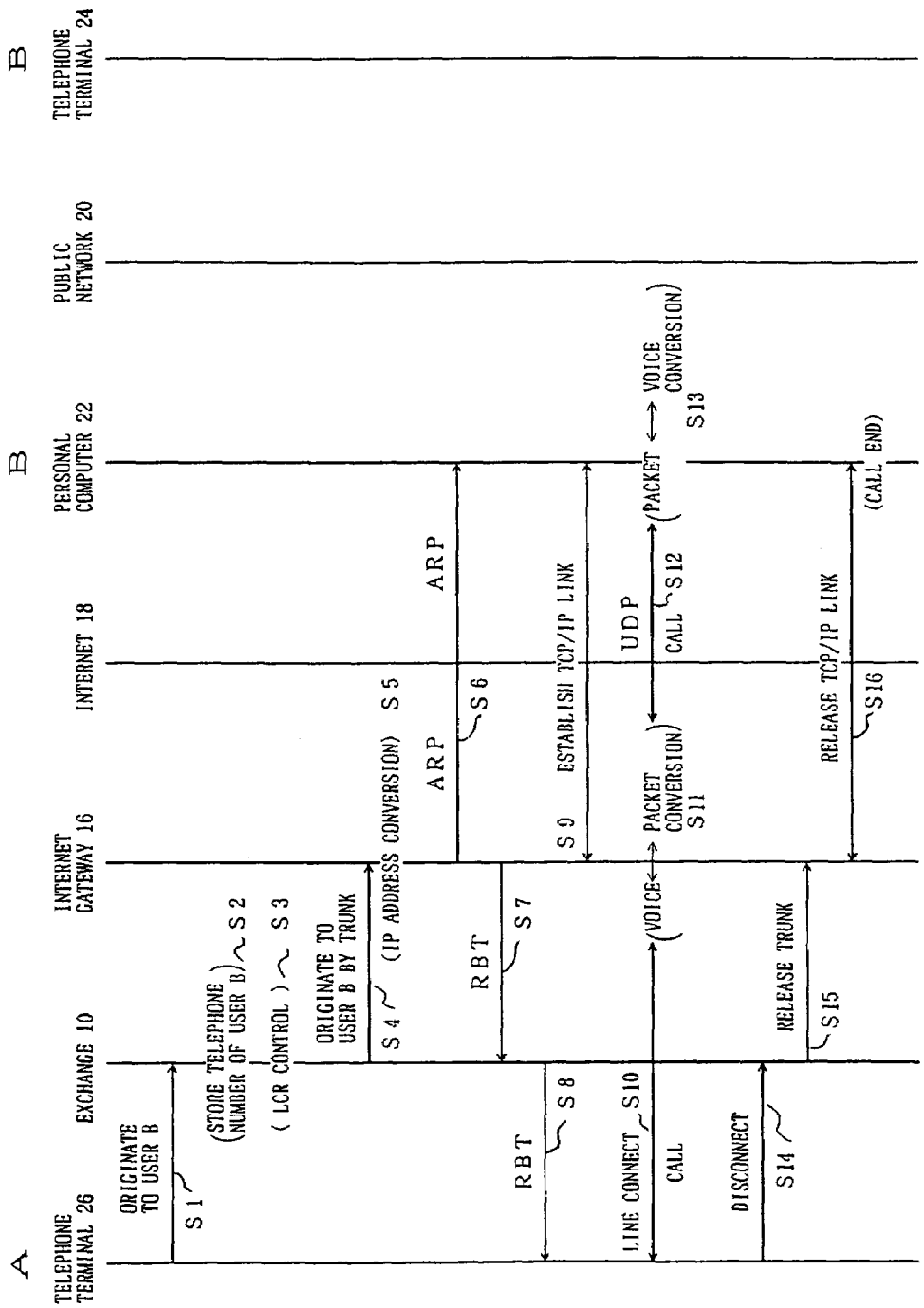
FIG. 5 is a sequence chart showing an operation according to the first embodiment of the present invention when a route is not switched.

FIG. 5 shows a sequence chart when a route is not switched. When the telephone terminal 26 originates a call to the user B in step 1, the exchange 10 stores the telephone number (123-4567) of the user B in the memory 34 in step 2 and selects the least expensive route by LCR controlling with the telephone number in step 3. When a route via the Internet is selected by LCR controlling, the exchange 10 originates a call to the user B from a trunk selected among the trunks $36_1$-$36_n$ through the switch 30 in step 4. The Internet gateway 16 converts the telephone number (123-4567) of a user B into the IP address of the personal computer 22 in step 5. Then, the Internet gateway 16 starts to connect to the personal computer 22 by using address resolution protocol (ARP) via the Internet 18 in step 6 and sends a ring back tone (RBT) to the exchange 10 in step 7. The exchange 10 sends the ring back tone (RBT) to the telephone terminal 26 in step 8. When a TCP/IP link is established between the Internet gateway 16 and the personal computer 22 in step 9, the line between the telephone terminal 26 and the Internet gateway 16 is connected in step 10. The Internet gateway 16 and the personal computer 22 communicate with each other by using UDP in step 12 such that a communication between the telephone terminal 26 and the personal computer 22 starts. At the time, conversion processes between voice and packets are carried out in the voice conversion part 42 of the Internet gateway 16 and in the personal computer 22 in steps 11, 13. When the connection between the telephone terminal 26 and the exchange 10 is disconnected in step 14, the trunk of the exchange 10 is released in step 15 and the TCP/IP link is released in step 16. Then, the call is completed.

Figure 6:
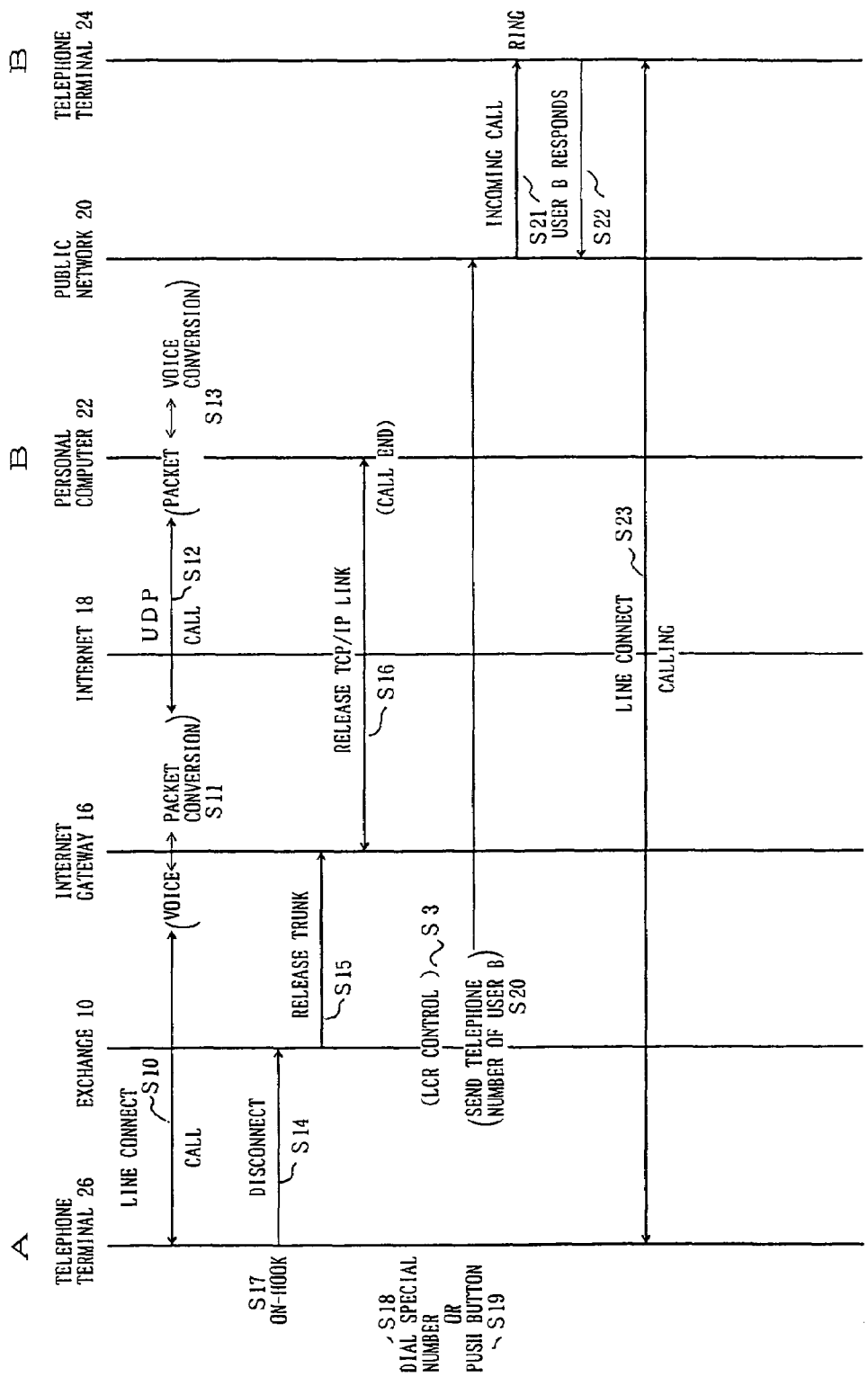
FIG. 6 is a sequence chart showing an operation according to the first embodiment of the present invention when a route is switched by an on-hook operation.

FIG. 6 shows a sequence chart when a route is switched by a switch method of an on-hook operation and dialing a special number or pushing a button. The switch method corresponds to one of the above-mentioned switch methods by a simple operation. As shown in FIG. 6, when the telephone terminal 26 is connected to the personal computer 22 via the Internet 18 in steps 11-13, the connection between the telephone terminal 26 and the exchange 10 is disconnected in step 14 as a result of an on-hook operation at the telephone terminal 26 in step 17. Then, the exchange 10 releases the trunk in step 15 and the TCP/IP link between the Internet gateway 16 and the personal computer 22 is released. As a result, the call is completed. Next, by dialing a special number (a predetermined special number) in step 18 or by pushing a button in step 19 at the telephone terminal 26, the exchange 10 performs the LCR controlling with the telephone number (123-4567) of the user B stored in the memory 34. The LCR controlling is carried out by functions of the LCR control part $32_1$, the switch control part $32_2$, and the re-origination control part $32_3$ in the control part 32. Then, the exchange 10 selects a trunk among the trunks $38_1$-$38_m$ for connections via the public telephone network 20. Next, the telephone number (123-4567) of the user B is sent to the public telephone network 20 in step 20 and arrives at the telephone terminal 24 in step 21. Then, the telephone terminal 24 rings. When the user B responds in step 22, the line is connected in step 23 and a call between the telephone terminal 26 and the telephone terminal 24 starts.

As mentioned above, since a network can be switched by a simple operation, the caller does not need to redial another number after disconnecting a connection for continuing a call when the speech quality of a call via the Internet degrades.

Figure 7:
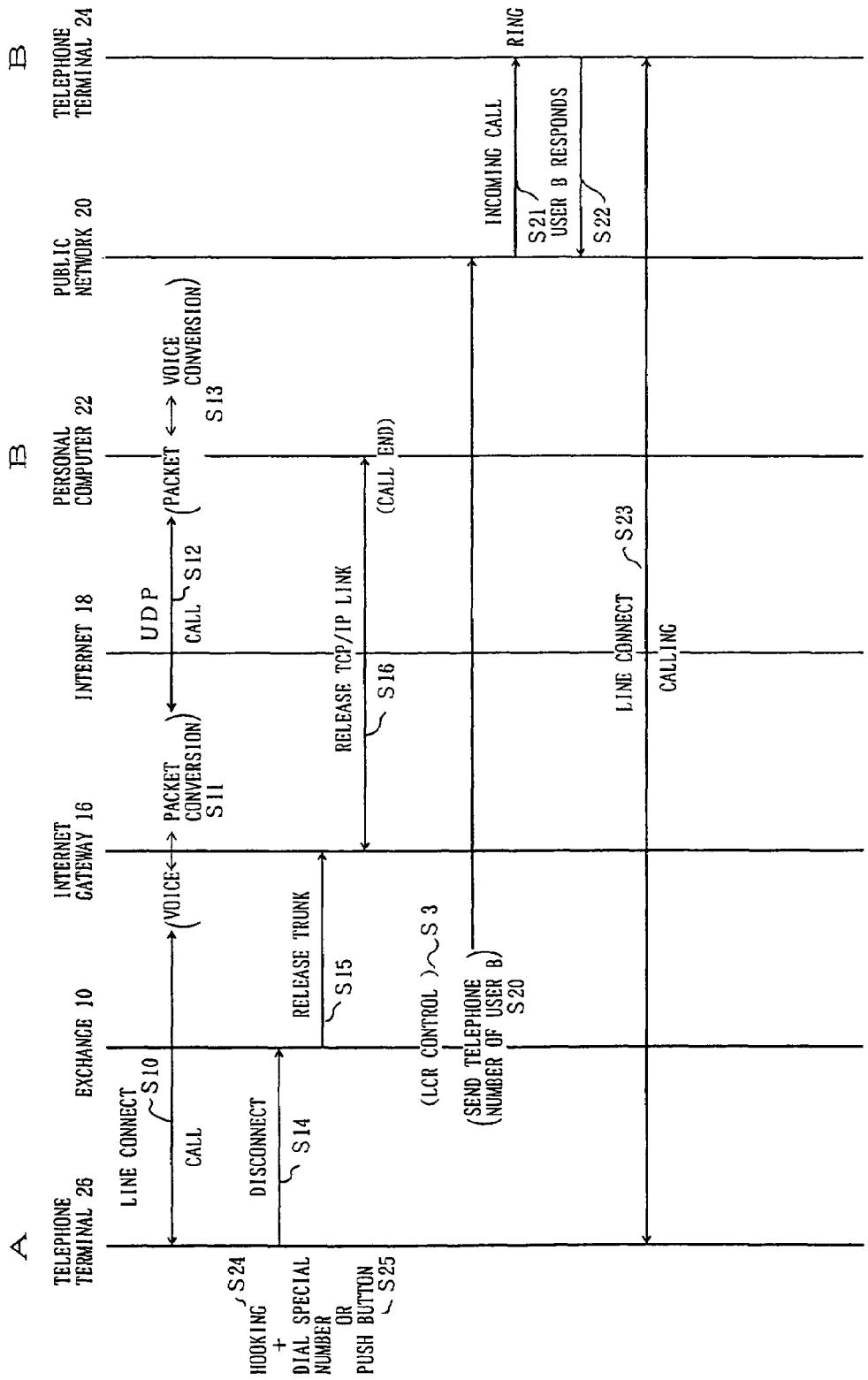
FIG. 7 is a sequence chart showing an operation according to the first embodiment of the present invention when a route is switched by a hooking operation.

FIG. 7 shows a sequence chart when a route is switched by a switch method performed by a hooking operation and dialing a special number or pushing a button. The switch method is also one of above-mentioned switch methods by a simple operation. As shown in FIG. 7, when the telephone terminal 26 is connected to the personal computer 22 via the Internet 18 in steps 10-13, the connection between the telephone terminal 26 and the exchange 10 is disconnected in step 14 as a result of dialing a special number or pushing a button (step 25) after a hooking operation at the telephone terminal 26 in step 24. Then, the exchange 10 releases the trunk in step 15 and the TCP/IP link between the Internet gateway 16 and the personal computer 22 is released. As a result, the call is completed. Next, the exchange 10 performs the LCR controlling with the telephone number (123-4567) of the user B stored in the memory 34. The LCR controlling is carried out by functions of the LCR control part $32_1$, the switch control part $32_2$, and the re-origination control part $32_3$ in the control part 32. Then, the exchange 10 selects a trunk among the trunks $38_1$-$38_m$ for connecting routes via the public telephone network 20. Next, the telephone number (123-4567) of the user B is sent to the public telephone network 20 in step 20 and arrives at the telephone terminal 24 in step 21. Then, the telephone terminal 24 rings. When the user B responds in step 22, the line is connected in step 23 and a call between the telephone terminal 26 and the telephone terminal 24 starts.

As mentioned above, since a network can be switched by a simple operation, the caller does not need to redial another number after disconnecting a line for continuing a call when the speech quality of a call via the Internet degrades.

Figure 8:
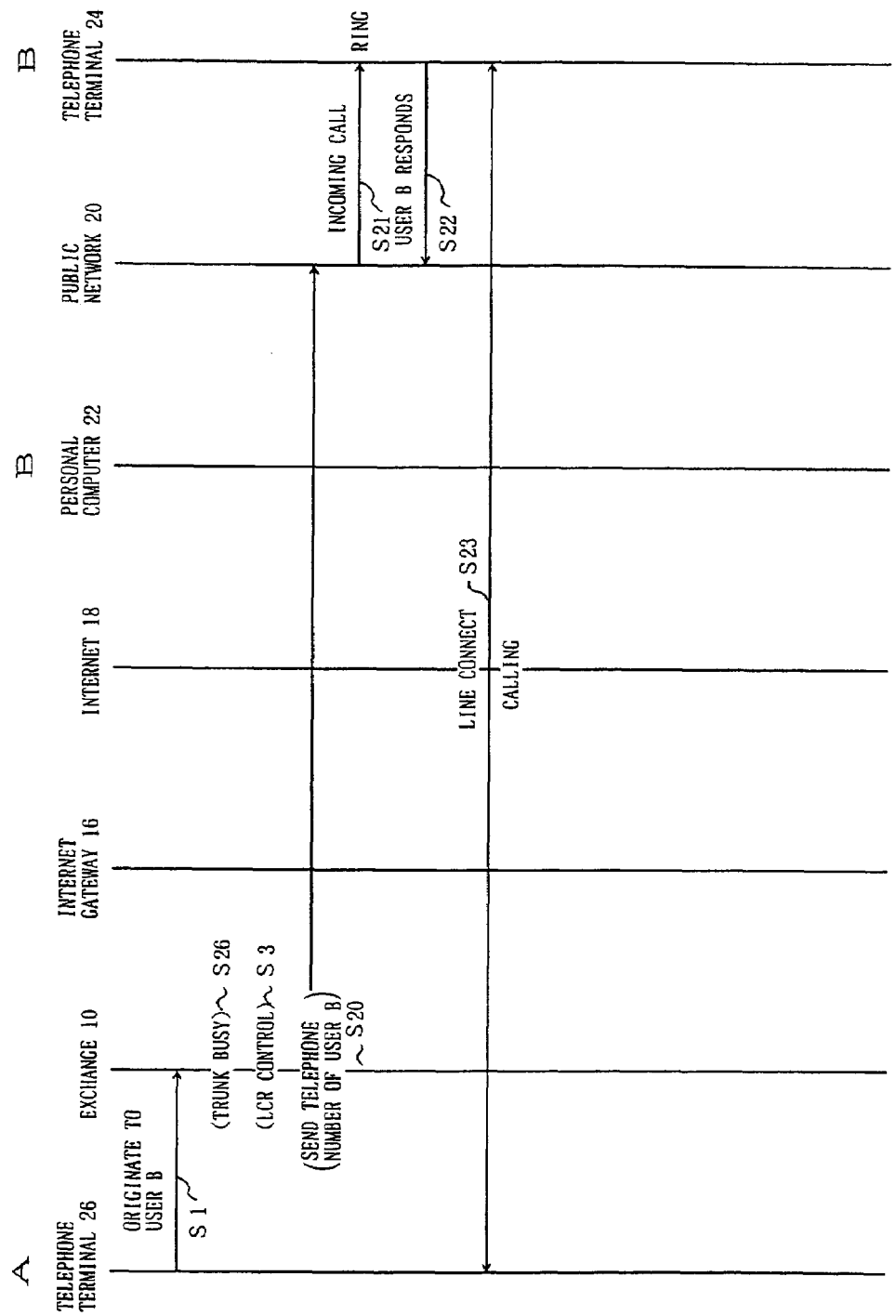
FIG. 8 is a sequence chart showing an operation according to the first embodiment of the present invention when a route via the Internet is busy.

As shown in FIG. 8, when the telephone terminal 26 originates a call to the user B in step 1 and the trunk to the Internet is busy in step 26, the exchange 10 selects a trunk among the trunks $38_1$-$38_m$ by the LCR control part $32_1$, the switch control part $32_2$, and the re-origination control part $32_3$ in the control part 32. Then, the telephone number (123-4567) of the user B is sent to the public telephone network 20 in step 20, and arrives at the telephone terminal 24 in step 21, then the telephone terminal 24 rings. When the user B responds in step 22, the line is connected in step 23 and a call between the telephone terminal 26 and the telephone terminal 24 starts.

As mentioned above, when the trunk to the Internet is busy, since the route is switched to a route via a network other than the Internet automatically, the caller can make a call without redialing.

Figure 9:
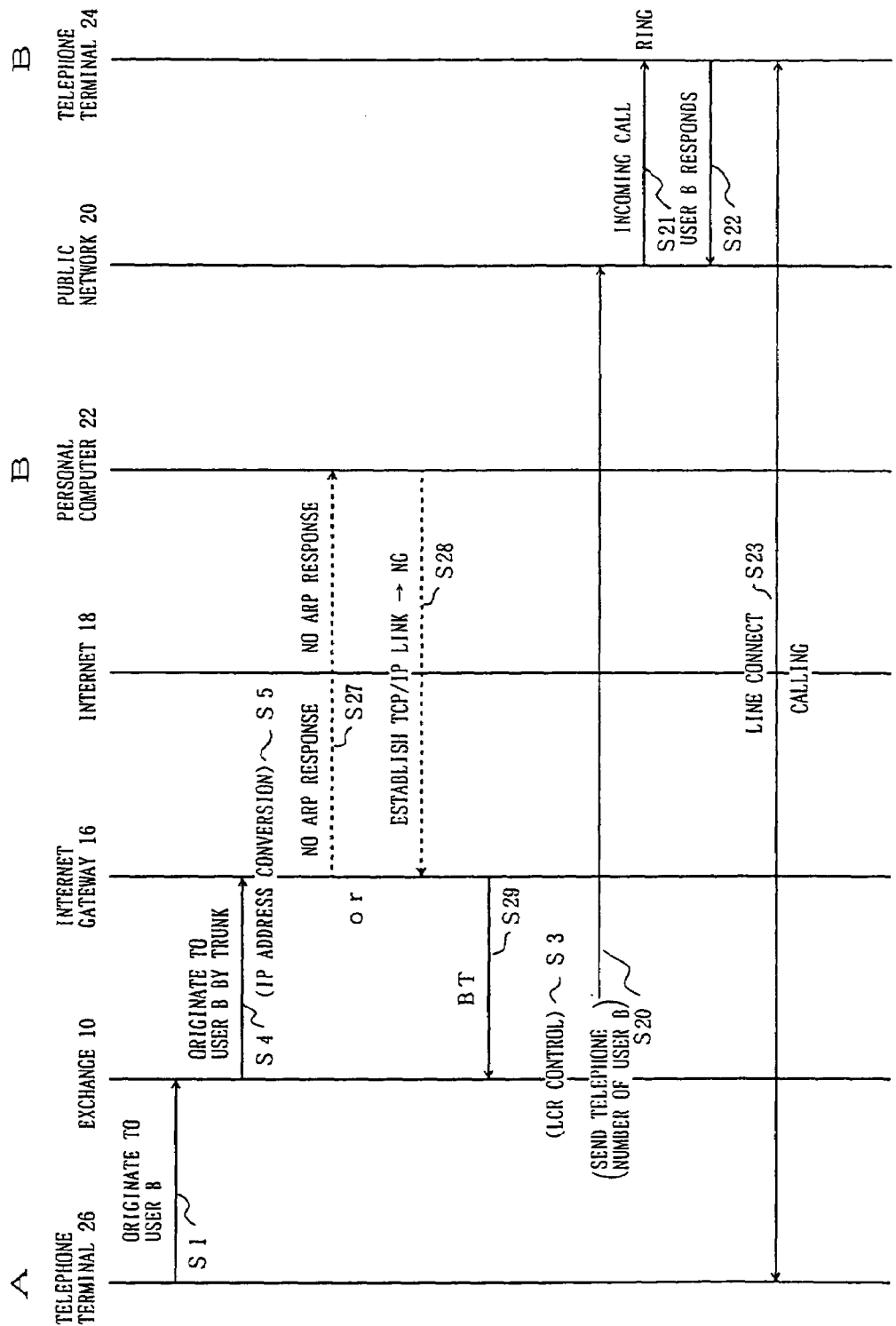
FIG. 9 is a sequence chart showing an operation according to the first embodiment of the present invention when a link via the Internet is not established.

As shown in FIG. 9, when the telephone terminal 26 originates a call to the user B in step 1, the exchange 10 originates a call to the user B from a trunk in step 4. The Internet gateway 16 converts the telephone number of the user B into the IP address of the personal computer 22 in step 5. Then, the Internet gateway 16 starts to connect to the personal computer 22 by using address resolution protocol (ARP) via the Internet 18. When there is no response of the address resolution protocol (ARP) due to malfunctions of the Internet 18 or the personal computer 22 and the like in step 27, or when the TCP/IP link between the Internet gateway 16 and the personal computer 22 is not established in step 28, the Internet gateway 16 sends a busy tone (BT) to the exchange 10 in step 29. The exchange 10 selects a trunk among the trunks $38_1$-$38_m$ by the LCR control part $32_1$, the switch control part $32_2$, and the re-origination control part $32_3$ in the control part 32. Then, the telephone number (123-4567) of the user B is sent to the public telephone network 20 in step 20, and arrives at the telephone terminal 24 in step 21. Then, the telephone terminal 24 rings. When the user B responds in step 22, the line is connected in step 23 and a call between the telephone terminal 26 and the telephone terminal 24 starts.

As mentioned above, when the connection via the Internet can not be established, since the route is switched to a route via a network other than the Internet automatically, the caller can start a call without redialing.

Figure 10:
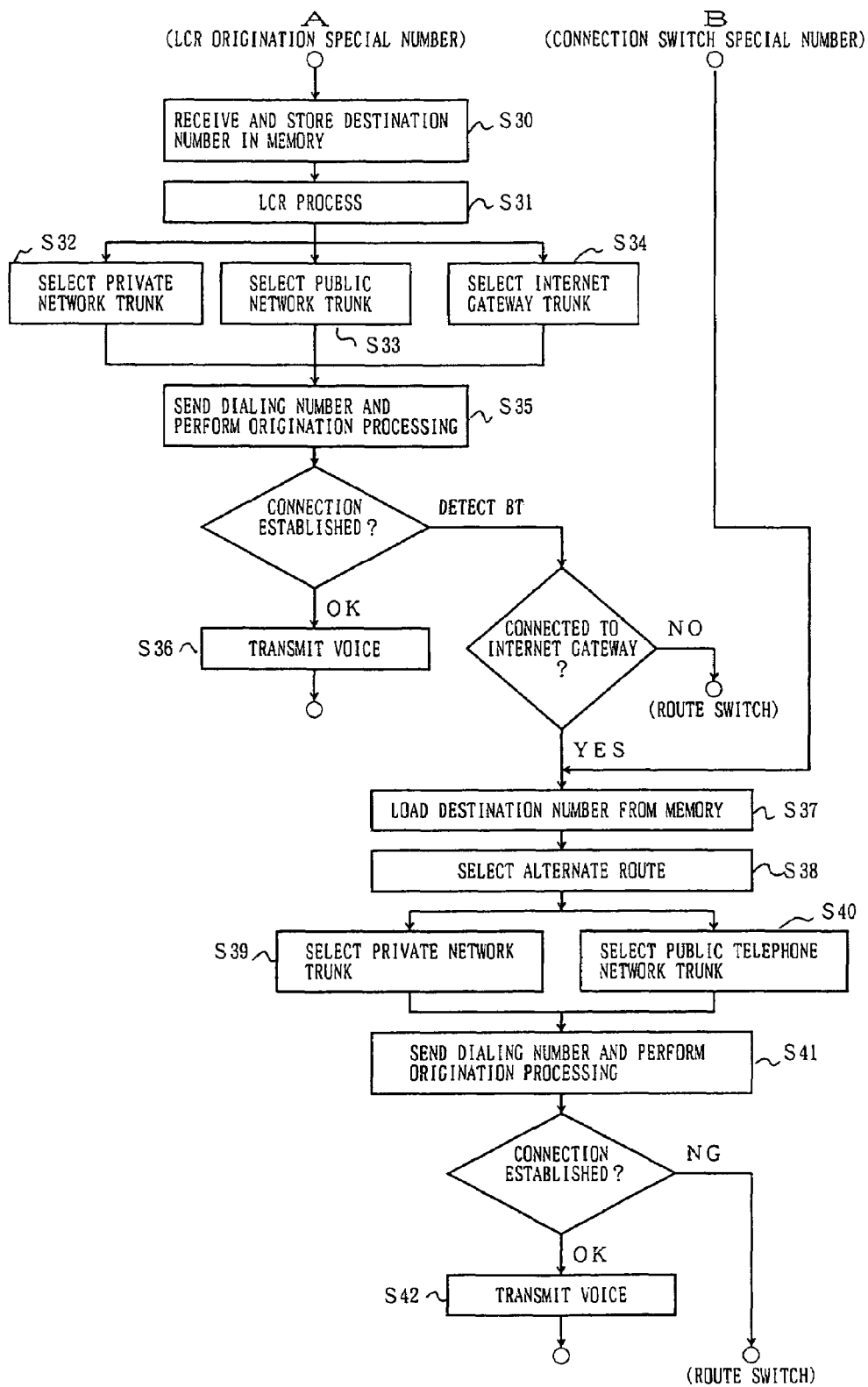
FIG. 10 is a flowchart showing an operation of a control part 32 of the exchange 10.

In the following, the operation of the exchange 10 corresponding to the above-mentioned sequences will be described in detail with reference to a flowchart in FIG. 10. FIG. 10 is a flowchart showing the operation of the control part 32 of the exchange 10. In this example, the exchange 10 includes trunks which are connectable to private networks. That is, the configuration shown in FIG. 3 further includes a private network and a plurality of trunks which are connectable to the private network, together with the Internet gateway 16, trunks $36_1$-$36_m$ which are connectable to the Internet gateway 16, the public telephone network 20, and trunks $38_1$-$38_m$ which are connectable to the public telephone network 20.

When the exchange 10 receives an LCR origination special number which is a predetermined special number added to a head of a destination number, the exchange 10 receives the destination number and stores it in the memory 34 in step 30. Next, an LCR process is performed by the LCR control part $32_1$ with the received number. Then, the exchange 10 selects a trunk among the private network trunk in step 32, the public network trunk in step 33 and the Internet gateway trunk in step 34. Then, the exchange 10 sends the dialing number to the selected trunk and performs origination processing in step 35.

Next, if a connection is established, voice is transmitted in step 36. When the exchange 10 detects a busy tone (BT) and is connected to the Internet gateway 16, the exchange 10 loads the destination number from the memory 34 by the switch control part $32_2$ in step 37, selects an alternate route in step 38 and selects the private network trunk in step 39 or the public telephone network trunk in step 40. After that, the exchange 10 sends the destination number and performs the origination process in step 41. When a connection is established, voice is transmitted to the selected trunk in step 42. When the connection is not established, a process such as route switch or the like is performed.

If the exchange 10 receives a connection switch special number (B) instead of the LCR origination special number first, the exchange 10 starts from the step 37 which is a process for loading the destination number from the memory. The processes after the step 37 are the same as those mentioned above.

Figure 11:
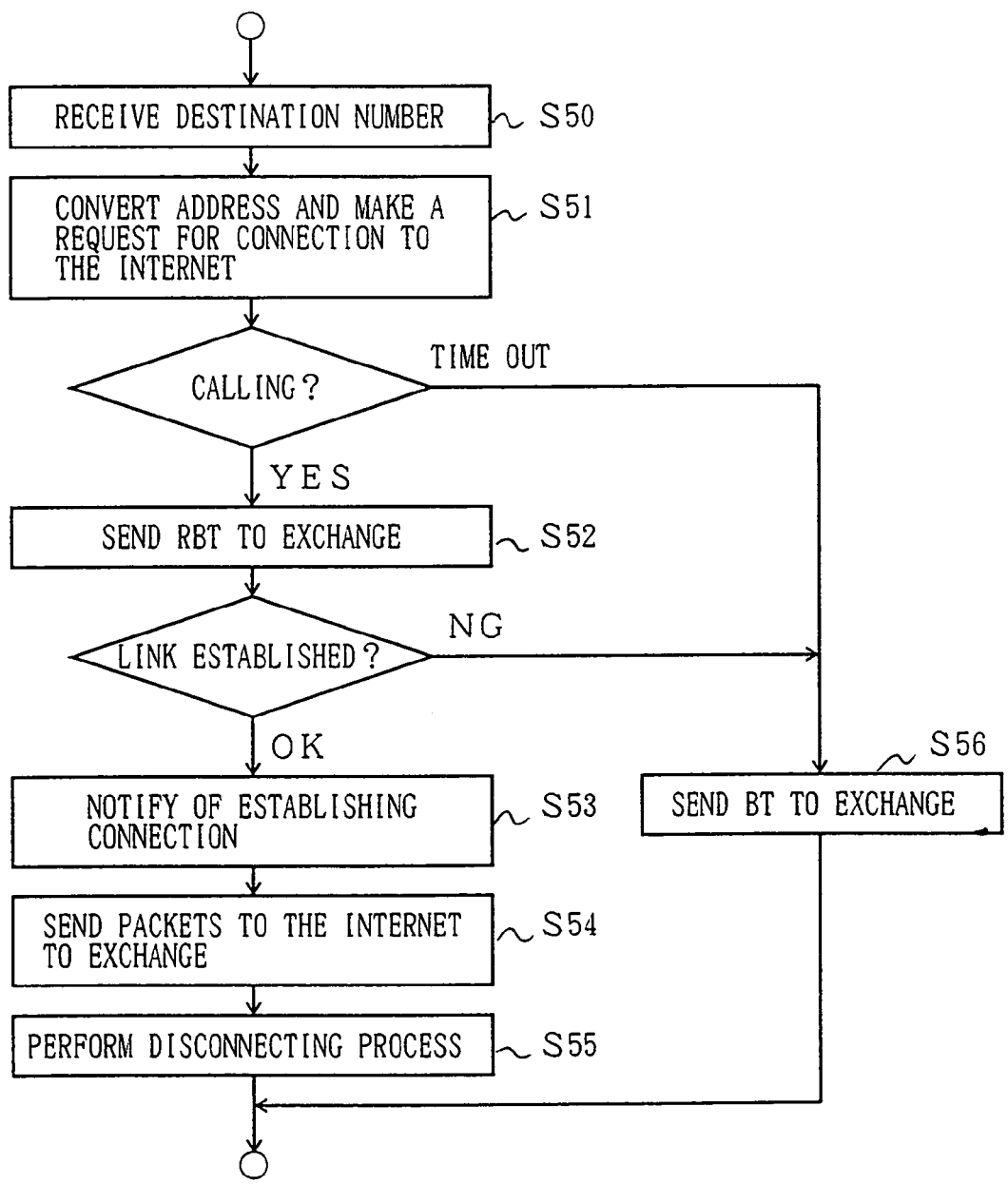
FIG. 11 is a flowchart showing an operation of the Internet gateway 16.

FIG. 11 is a flowchart showing the operation of the Internet gateway 16. When the destination number/IP address converter 44 receives a destination number from the exchange 10 via the line interface 40 in step 50, the destination number/IP address converter 44 converts the destination number into the IP address and the Internet gateway 16 makes a request for connection to the Internet in step 51. At this time, while the Internet gateway 16 is calling, the Internet gateway 16 sends the ring back tone (RBT) to the exchange 10 in step 52. When a link is not established to the personal computer which is called and time-out occurs after step 51, the Internet gateway 16 sends the busy tone (BT) to the exchange in step 56. Also, when a link is not established after sending the ring back tone (RBT) in step 52, the Internet gateway 16 sends the busy tone (BT) to the exchange 10 in step 56.

When the link is established after sending the ring back tone (RBT) to the exchange 10 in step 52, the Internet gateway 16 notifies the exchange 10 of completion of establishing the connection in step 53 and converts a voice signal into packets. Then, the packets are sent to the Internet 18 in step 54. When the call is completed, a disconnecting process is performed in step 55.

FIG. 12 shows an address conversion example in the address conversion process in step 51 shown in FIG. 11. The address conversion example will be described with reference to FIG. 12 and FIG. 13.

Figure 13:
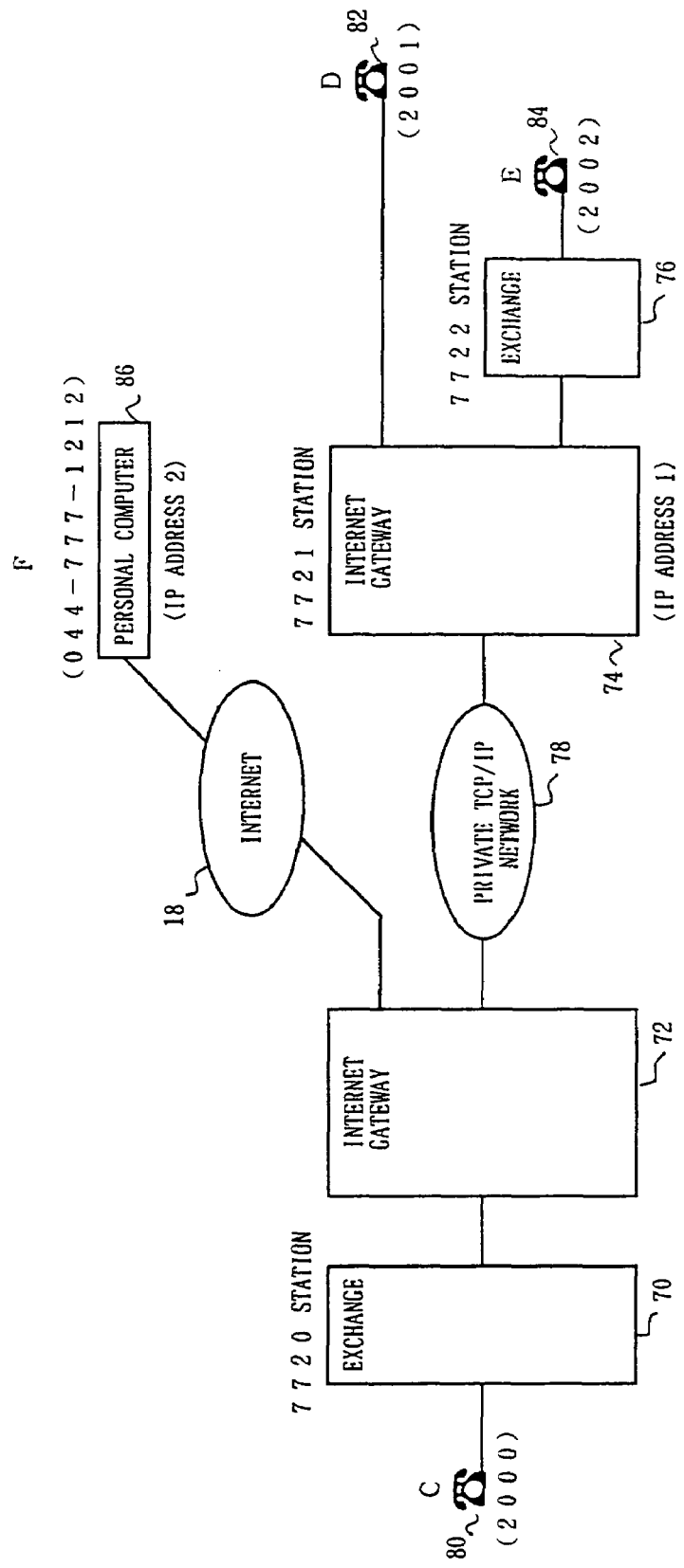
FIG. 13 is a block diagram of a second embodiment of the present invention.

FIG. 13 shows a communication system according to a second embodiment of the present invention. In FIG. 13, a telephone terminal 80 of a user C is connected to an exchange 70 (7720 station). The exchange 70 is connected to an Internet gateway 74 (7721 station) via an Internet gateway 72 and a private TCP/IP network 78. A telephone terminal 82 of a user D and an exchange 76 (7722 station) is connected to the Internet gateway 74. A telephone terminal 84 of a user E is connected to the exchange 76. The Internet gateway 72 is connected to a personal computer 86 of a user F via the Internet 18. The apparatuses have the following addresses: the telephone terminal 80:2000, the exchange 70:7720, the Internet gateway 74:7721 and IP address 1, the exchange 76:7722, the telephone terminal 82:2001, the telephone terminal 84:2002, the personal computer 86:IP address 2. The telephone number of the user F is 044-777-1212.

① in FIG. 12 will be described with reference to FIG. 13. When the telephone terminal 80 sends 7721-2001 to the exchange 70 to originate a call to the telephone terminal 82, the Internet gateway 72 receives 7721-2001 from the exchange 70, and converts it into 7721-IP address 1-2001 as shown in ① in FIG. 12. Then, the Internet gateway 72 sends the converted address to the Internet gateway 74. As a result, the Internet gateway 74 is connected to the telephone terminal 82 and a call starts.

Next, ② in FIG. 12 will be described with reference to FIG. 13. When the telephone terminal 80 sends 7721-2002 to the exchange 70 to originate a call to the telephone terminal 84, the Internet gateway 72 receives 7721-2002 from the exchange 70, and converts it into 7721-IP address 1-2002 as shown in ② in FIG. 12. Then, the Internet gateway 72 sends the converted address to the Internet gateway 74. As a result, the Internet gateway 74 is connected to the telephone terminal 84 and a call starts.

Next, ③ in FIG. 12 will be described with reference to FIG. 13. When the telephone terminal 80 sends 044-777-1212 to the exchange 70 to originate a call to the personal computer 86, the Internet gateway 72 receives 044-777-1212 from the exchange 70, and converts it into IP address 2 as shown in ③ in FIG. 12. Then, the Internet gateway 72 sends the converted address to the Internet 18. As a result, the Internet gateway 72 is connected to the personal computer 86 and a call starts.

In the following, a computer readable medium storing an exchange control program according to the present invention will be described. The memory 34 stores a program for operating the control part 32 according to the flowchart shown in FIG. 10. A conventional exchange can be used as the exchange of the present invention by installing the program in a memory of the conventional exchange. The memory 34 can be realized by a computer readable medium such as an electronic memory, a hard disk, a magneto-optic disk and the like.

In the above-mentioned description, the public telephone network 20 can be a wired network or a wireless network. In addition, a plurality of different networks can be used other than the Internet and the public telephone network 20. Moreover, the private TCP/IP network 78 can be the Internet 18.

According to the present invention, it becomes easy to connect to the called party via the Internet or, for example, via the public telephone network by supplying a telephone number of a telephone terminal. Therefore, a caller does not need to know each destination number for each network. The caller needs to know only one number.

In addition, according to the present invention, since a call via the Internet can be switched to one via a network other than the Internet easily by a simple operation, the caller does not need to disconnect a connection and redial a number when the speech quality of the call via the Internet degrades.

Moreover, according to the present invention, the exchange automatically selects the least expensive network from a plurality of connectable networks including the Internet with a telephone number of a telephone terminal of the called party. Therefore, a caller does not need to know each destination number for each network for selecting the least expensive network. The caller needs to know only a telephone number. In addition, the telephone charge for a long distance call can be reduced since the least expensive network is automatically selected.

Moreover, according to the present invention, when the route via the Internet is busy, or when the connection via the Internet can not be established due to a malfunction of the Internet and the like, since the route is switched to a route via a network other than the Internet and the exchange originates a call automatically, the caller can make a call without redialing.

The present invention is not limited to the specifically disclosed embodiments, and variations and modifications may be made without departing from the scope of the invention.

What is claimed is:

1. An exchange comprising:
a first trunk that is connectable to an Internet gateway that includes a voice processing part for converting voice into packet data;
a second trunk that is connectable to a public telephone network;
a switch control part for controlling the exchange to switch a route of a call from a network to another network;
a re-origination control part for controlling the exchange to re-originate a call after switching the route; and
a memory for storing a telephone number of a called party that is received from a calling party;
wherein:
when a connection has been established to the Internet gateway via the first trunk, the switch control part causes the exchange to disconnect a connection to the Internet gateway via the first trunk and to release the first trunk in response to pushing a button by a caller of the calling party after a flash operation by the caller during a telephone call to a first terminal of the called party via the Internet via the first trunk, and wherein the re-origination control part thereafter causes the exchange to re-originate a call of the calling party to a second terminal of the called party via the public telephone network via the second trunk by using the telephone number of the called party stored in the memory so as to ring the second terminal of the called party; and
when a connection has been established to the public telephone network via the second trunk, the switch control part causes the exchange to disconnect a connection to the public telephone network via the second trunk and to release the second trunk in response to pushing a button by the caller of the calling party after a flash operation by the caller during a telephone call to the second terminal of the called party via the public telephone network via the second trunk, and wherein the re-origination control part thereafter causes the exchange to re-originate a call of the calling party to the first terminal of the called party via the Internet gateway via the first trunk by using the telephone number of the called party stored in the memory.

2. An exchange comprising:

a first trunk that is connectable to an Internet gateway that includes a voice processing part for converting voice into packet data;

a second trunk that is connectable to a public telephone network;

a switch control part for controlling the exchange to switch a route of a call from a network to another network;

a re-origination control part for controlling the exchange to re-originate a call after switching the route; and a memory for storing a telephone number of a called party that is received from a calling party;

wherein:

when a connection has been established to the Internet gateway via the first trunk, the switch control part causes the exchange to disconnect a connection to the Internet gateway via the first trunk and to release the first trunk in response to pushing a button by a caller of the calling party after a flash operation by the caller during a telephone call to a first terminal of the called party via the Internet via the first trunk, and wherein the re-origination control part thereafter causes the exchange to re-originate a call of the calling party to a second terminal of the called party via the public telephone network via the second trunk by using the telephone number of the called party stored in the memory so as to ring the second terminal of the called party; and when a connection has been established to the public telephone network via the second trunk, the switch control part causes the exchange to disconnect a connection to the public telephone network via the second trunk and to release the second trunk in response to pushing a button by the caller of the calling party after a flash operation by the caller during a telephone call to the second terminal of the called party via the public telephone network via the second trunk, and wherein the re-origination control part thereafter causes the exchange to re-originate a call of the calling party to the first terminal of the called party via the Internet gateway via the first trunk by using the telephone number of the called party stored in the memory.

3. An exchange comprising:

a first trunk that is connectable to an Internet gateway that includes a voice processing part for converting voice into packet data;

a second trunk that is connectable to a public telephone network;

a switch control part for controlling the exchange to switch a route of a call from a network to another network;

a re-origination control part for controlling the exchange to re-originate a call after switching the route; and a memory for storing a telephone number of a called party that is received from a calling party;

wherein:

when a connection has been established to the Internet gateway via the first trunk, the switch control part causes the exchange to disconnect a connection to the Internet gateway via the first trunk and to release the first trunk in response to receiving a special number dialed by a caller of the calling party after a flash operation by the caller during a telephone call to a first terminal of the called party via the Internet via the first trunk, and wherein the re-origination control part thereafter causes the exchange to re-originate a call of the calling party to a second terminal of the called party via the public telephone network via the second trunk by using the telephone number of the called party stored in the memory so as to ring the second terminal of the called party; and when a connection has been established to the public telephone network via the second trunk, the switch control part causes the exchange to disconnect a connection to the public telephone network via the second trunk and to release the second trunk in response to pushing a button by the caller of the calling party after an a flash operation by the caller during a telephone call to the second terminal of the called party via the public telephone network via the second trunk, and wherein the re-origination control part thereafter causes the exchange to re-originate a call of the calling party to the first terminal of the called party via the Internet gateway via the first trunk by using the telephone number of the called party stored in the memory.

* * * * *